3,755,414
4,4-DESMETHYL-3,11-DIOXOOLEANA-4,12-DIEN-30-OIC ACIDS AND INTERMEDIATES
John S. Baran, Morton Grove, and Barnett S. Pitzele, Skokie, Ill., assignors to G. D. Searle & Co., Chicago, Ill.
No Drawing. Filed Aug. 18, 1971, Ser. No. 172,903
Int. Cl. C07c 61/36, 69/74
U.S. Cl. 260—468.5    4 Claims

ABSTRACT OF THE DISCLOSURE

The above-captioned compounds are manufactured from the 3-nor-4,4-desmethyl-4-isopropylidene alkyl esters of 11-oxoolean-12-en-30-oic acid. They are useful as pharmacological, e.g. hypocholesterolemic and hypotensive, agents.

---

The present invention is concerned generally with derivatives of the oleanane family. More particularly, the present invention is concerned with compounds of the following general formula

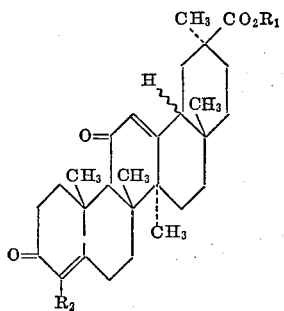

wherein $R_1$ is hydrogen or a lower alkyl radical, $R_2$ is hydrogen or a methyl radical and the wavy line alternatively indicates the 18α or 18β configuration.

The lower alkyl radicals represented are methyl, ethyl, propyl, butyl, pentyl, hexyl, heptyl and their corresponding branched-chain isomers.

The novel compounds of this invention are conveniently prepared by a series of reactions beginning with the hydroxylation of the appropriate alkyl ester of 3-nor-4,4-desmethyl-4-isopropylidene-11-oxo-18β-olean-12-en-30-oic acid. That hydroxylation is conveniently effected with osmium tetroxide and the resulting glycol then is cleaved with lead tetraacetate to yield the carbonyl substituent. For example, when methyl 3-nor-4-isopropylidene-4,4-desmethyl-11-oxo-18β-olean-12-en-30-oate is treated with osmium tetroxide in pyridine, methyl 3-nor-4-hydroxy-4-(hydroxyisopropyl) - 4,4-desmethyl-11-oxo-18β-olean-12-en-30-oate is produced. Subsequent treatment of the latter compound with lead tetraacetate in benzene affords methyl 3 - nor - 4,4-desmethyl-4,11-dioxo-18β-olean-12-en-30-oate. The 4-carbonyl compound is then allowed to react with Grignard reagent to form, for example, the 4-hydroxy-4-methyl derivative, which, when further allowed to react with thionyl chloride, yields the 4-methyl-Δ⁴ compound. In that manner, when methyl 3-nor-4,4-desmethyl-4,11-dioxo-18β-olean-12-en-30-oate is treated with methyl magnesium bromide, methyl 3-nor-4-hydroxy-4-desmethyl-11 - oxo-8β-olean-12-en-30-oate results. Allowing the latter compound to react with thionyl chloride affords methyl 3nor-4-desmethyl-11-oxo-18β-oleana-4,12-dien-30-oate. The $\Delta^4$ double bond is hydroxylated again with osmium tetroxide and the resulting glycol is cleaved with lead tetraacetate in the same manner as noted above to yield the 4,5-seco-3,5,11-trioxo alkyl ester derivative of 4,4-desmethyl-olean-12-en-30-oic acid. Typical, treatment of methyl 3 - nor - 4-desmethyl-11-oxo-18β-oleana-4,12-dien-30-oate with osmium tetroxide in pyridine affords methyl 3 - nor - 4,5-dihydroxy-4-desmethyl-11-oxo-18β-olean-12-en-30-oate. Cleavage of that compound with lead tetraacetate in benzene yields methyl 4,5-seco-4,4-desmethyl-3,5,11-trioxo-18β-olean-12-en-30-oate. Cyclization to form the 3,11-dioxo-$\Delta^{4,12}$ alkyl ester of oleanan-30-oic acid is accomplished with an alkali metal hydroxide such as potassium hydroxide. For example, contacting methyl 4,5-seco - 4,4 - desmethyl - 3,5,11-trioxo-18β-olean-12-en-30-oate with potassium hydroxide in methanol affords methyl 4,4 - desmethyl - 3,11-dioxo-18β-oleana-4,12-dien-30-oate. Cyclization of the 4,5-seco compound may also be accomplished by refluxing with a mineral acid, such as hydrochloric acid, to yield the 4,4-desmethyl-3,11-dioxo-18α-oleana-4,12-dien-30-oic acid.

The 4,5-seco compounds may alternatively be produced by the ozonolysis and subsequent reduction with zinc and acetic acid of the 4-desmethyl-$\Delta^{4,12}$ alkyl esters of 11-oxooleanan-30-oic acid. Thus, when methyl 4-desmethyl - 11 - oxo-18β-oleana-4,12-dien-30-oate is treated with ozone and then with zinc and acetic acid, methyl 4,5-seco - 4,4-desmethyl-3,5,11-trioxo-18β-olean-12-en-30-oate is produced.

The present compounds are useful as pharmacological agents. For example, they possess hypocholesterolemic and hypotensive activity. The hypocholesterolemic activity is shown by an assay described previously in U.S. Pat. 3,462,466.

The utility as hypotensive agents is demonstrated by the following test procedure which makes use of the fact that chronic administration of desoxy=corticosterone acetate induces a self-sustaining hyper=tension that is similar in many respects to essential hyptertension in man (D. N. Green et al., American Journal of Physiology, 170, 94, 1952). In this test, 50-g. male Charles River rats are implanted with a 20 mg. wax pellet containing 10 mg. of desoxycorticosterone acetate. After 5 weeks, their systolic blood pressures are measured electrosphygmographically on the tail artery. The following day, groups of 5 rats are then given 60 m.p.k. of test compound intragastrically. Four hours later, the blood pressures are again measured and the decrease in pressure from control day is calculated and compared with concurrent controls. A compound is considered active if it produces a significant decrease in systolic blood pressure.

The invention will appear more fully from the examples which follow. They are not to be construed as limiting the invention either in spirit or in scope as many variations in materials and methods will be apparent to one skilled in the art. In the following examples temperatures are given in degrees centigrade (° C.) and quantities of material are presented in parts by weight unless parts by volume is specified. The relationship existing between parts by weight and parts by volume is the same as that existing between grams and milliliters.

EXAMPLE 1

To a stirred mixture of 5 parts of methyl 3-nor-4-isopropylidene - 4,4 - desmethyl-11-oxo-18β-olean-12-en-30-oate and 28.1 parts of pyridine is added over a period of about 30 minutes, 57.1 parts by volume of a solution of 50 parts of osmium tetroxide dissolved in 982 parts of pyridine. Stirring is continued for an additional 30 minutes and then 3 parts by volume of the above osmium tetroxide-pyridine solution is added. After stirring for an additional 30 minutes, 5 parts by volume of the osmium tetroxide-pyridine solution is added and the mixture is stirred for about 10 minutes. Then that mixture is quenched with a solution of 5.7 parts of sodium bisulfite, 86 parts of water and 42.2 parts of pyridine. The mixture is heated on a steam bath for about 2 hours and then added rapidly to a mixture of about 1500 parts of water and ice. Stirring is continued for about 64 hours after which 1000 parts of water is added. The mixture is filtered and the collected precipitate is washed with water and air dried. The crude product is dissolved in a 1:1 mixture of chloroform and methanol and filtered. Benzene is added to the filtrate and that solution is evaporated to dryness to yield, after recrystallization from methylene chloride-methanolbenzene, pure methyl 3-nor-4α-hydroxy-4β-(hydroxyisopropyl) - 4,4-desmethyl-11-oxo-18β-olean-12-en-30-oate. That compound melts at about 199–201° and displays nuclear magnetic resonance maxima at 51, 60, 68, 69, 76, 85, 223 and 342 hertz.

EXAMPLE 2

17 parts of methyl 3-nor-4α-hydroxy-4β-(hydroxyisopropyl) - 4,4-desmethyl-11-oxo-18β-olean-12-en-30-oate is dissolved in 879 parts of benzene and filtered. The filtrate is treated with a slurry of 18 parts of lead tetraacetate in 220 parts of benzene in portions until thin layer chromatography indicates that the starting material is depleted. Then the mixture is stirred, after the addition of 5.5 parts of ethylene glycol, for 15 minutes and filtered. The filtrate is washed with water, dried over anhydrous magnesium sulfate and evaporated to dryness to yield crude product. Recrystallization of the crude product from methylene chloride-methanol affords pure methyl 3-nor-4,4-desmethyl-4,11-dioxo-18β-olean-12-en-30-oate displaying a maximum in the ultraviolet spectrum at about 247.5 millimicrons and maxima in the nuclear magnetic resonance spectrum at about 50, 60, 69, 84, 223 and 347 hertz.

EXAMPLE 3

To a solution of 10 parts of methyl 3-nor-4,4-desmethyl - 4,11-dioxo-18β-olean-12-en-30-oate and 300 parts by volume of a 1:1 tetrahydrofuran-ethyl ether solution is added dropwise 8 parts by volume of 3 N methyl magnesium bromide in ether solution. That mixture is allowed to react until thin layer chromatography indicates that the starting material is consumed. Acetic acid and water are added to the mixture which is then concentrated to a small volume and diluted with benzene. The benzene solution is washed with water, then with aqueous sodium bicarbonate, and dried over anhydrous magnesium sulfate. After evaporation to dryness, there is obtained methyl 3 - nor-4-hydroxy-4-desmethyl-11-oxo-18β-olean-12-en-30-oate which melts at about 201–203° and exhibits nuclear magnetic resonance maxima at about 50, 67, 78, 82, 222, and 345 hertz.

EXAMPLE 4

A stirred solution of 36.1 parts of methyl 3-nor-4-hydroxy-4-desmethyl-11-oxo-18β-olean-12-en-30-oate in 283 parts of pyridine is cooled under a nitrogen atmosphere to about −15° in a sodium chloride-ice water bath. To that solution is added 11.78 parts of thionyl chloride and the solution is allowed to stir for about 20 minutes. Then 633 parts of benzene containing 25.3 parts of ethanol is added in one portion. The resulting solution is washed with aqueous 4 N hydrochloric acid until the reaction mixture is acidic and then it is washed successively with water and sodium bicarbonate, dried over anhydrous magnesium sulfate, filtered and evaporated to dryness. After recrystallization from methylene chloride-methanol, methyl 3 - nor-4-desmethyl-11-oxo-18β-oleana-4,12-dien- 30-oate is obtained. That material displays a maximum in the ultraviolet spectrum at about 248.5 millimicrons and absorption maxima in the infrared spectrum at about 5.78, 6.02 and 6.20 microns.

EXAMPLE 5

A mixture of 1.0 part of methyl 3-nor-4-desmethyl-11-oxo-18β-oleana-4,12-dien-30-oate, 9.82 parts of pyridine and 0.675 part of osmium tetroxide is stirred for 30 minutes. After that time, 9.82 parts of pyridine and 1.2 parts of sodium bisulfite in 20 parts of water is added and that solution is stirred at 50° for 30 minutes. The reaction mixture is diluted with 110 parts of water and the precipitate which forms is collected by filtration, washed with water and dried under reduced pressure to yield methyl 3-nor - 4,5 - dihydroxy-4-desmethyl-11-oxo-18β-olean-12-en-30-oate displaying infrared absorption maxima at 2.90, 5.78, 6.00 and 6.19 microns.

EXAMPLE 6

0.500 part of methyl 3-nor-4,5-dihydroxy-4-desmethyl-11-oxo-18β-olean-12-en-30-oate is dissolved in 176 parts of anhydrous benzene and treated, while stirring, with 0.100 part portions of lead tetraacetate until thin layer chromatography indicates all the starting material is consumed. After stirring for an additional hour, 2.23 parts of ethylene glycol is added and the mixture is washed with water and then aqueous sodium bisulfite, dried over anhydrous magnesium sulfate and evaporated to dryness. The resulting material is triturated with methanol to afford crystalline methyl 4,5-seco-4,4-desmethyl-3,5,11-trioxo-18β-olean-12-en-30-oate. That compound exhibits absorption maxima in the nuclear magnetic resonance spectrum at about 51, 70, 81.5, 84, 127.5, 223 and 350 hertz. That compound is further characterized by absorption in the ultraviolet spectrum at about 249.5 millimicrons.

EXAMPLE 7

A mixture of 8.8 parts of methyl 4,5-seco-4,4-desmethyl-3,5,11-trioxo-18β-olean-12-en-30-oate, a solution of 2 parts of potassium hydroxide dissolved in 79.2 parts of methanol, and 158.4 parts of methanol is stirred at reflux under nitrogen for 30 minutes, then cooled and neutralized with 7.35 parts of acetic acid. To that solution is added 50 parts of water and the mixture is evaporated almost to dryness under reduced pressure. The resulting crystalline material is triturated with water, filtered and dried under reduced pressure to yield methyl 4,4-desmethyl - 3,11 - dioxo-18β-oleana-4,12-dien-30-oate melting at about 237.5–238°. That material is structurally represented by the following formula

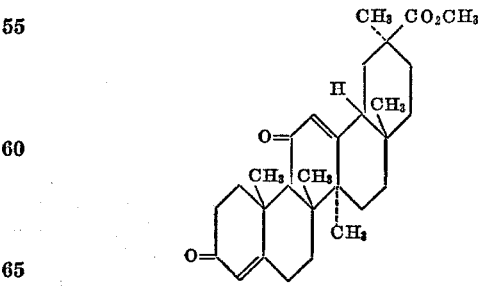

EXAMPLE 8

A mixture of 2.0 parts of methyl 4,4-desmethyl-3,11-dioxo-18β-oleana-4,12-dien-30-oate, 178 parts of methanol, 15 parts of potassium hydroxide and 50 parts of water is refluxed under a nitrogen atmosphere for about 3½ hours. That mixture is diluted with water and acetic acid added. After further addition of water, the precipitate which forms is collected by filtration, washed with water and dried under reduced pressure, thus affording 4,4 - desmethyl - 3,11 - dioxo-18β-oleana-4,12-dien-30-oic acid. That compound displays absorption maxima in the ultraviolet spectrum at about 243 millimicrons with a molecular extinction coefficient of about 12,500 and is represented by the following structural formula

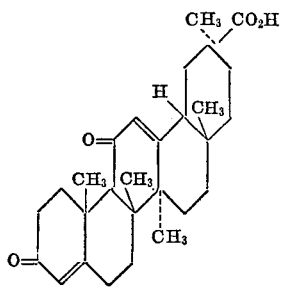

EXAMPLE 9

A mixture of 0.200 part of methyl 4,5-seco-4,4-desmethyl-3,5,11-trioxo-18β-olean-12-en-30-oate, 10.5 parts of acetic acid, 1.185 parts of hydrochloric acid and 0.1 part of water is refluxed under a nitrogen atmosphere for about 1½ hours and then cooled. To that solution is added water and the resulting precipitate is collected by filtration and air dried. Trituration of that dry material with methanol yields crystalline 4,4-desmethyl-3,11-dioxo-18α-oleana-4,12-dien-30-oic acid.

EXAMPLE 10

A mixture of 7.4 parts of methyl 4,4-desmethyl-3,11-dioxo-18β-oleana-4,12-dien-30-oate, 155 parts of acetic acid and 17.6 parts of hydrochloric acid is heated on a steam bath for about 45 hours. After that time the reaction mixture is rapidly poured into a vigorously stirred mixture of ice and water. That mixture is filtered and the precipitate which collects is washed with water and air dried. The resulting product is triturated with methanol and filtered to yield 4,4-desmethyl-3,11-dioxo-18α-oleana-4,12-dien-30-oic acid, identical to the product of Example 9. That compound displays maxima in the nuclear magnetic resonance spectrum at about 47, 78, 82, 95, and 348 hertz and is represented by the following structural formula

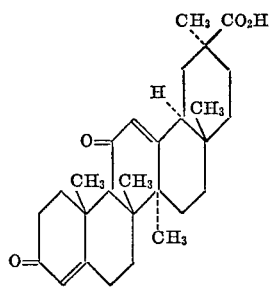

EXAMPLE 11

0.02 part of methyl 3-nor-4,5-dihydroxy-4-desmethyl-11-oxo-18β-olean-12-en-30-oate, 55 parts of 2,4,6-trimethylpyridine and 2.0 parts of lithium iodide are combined with stirring under a nitrogen atmosphere at room temperature. That mixture is heated slowly to reflux and the refluxing is continued for about 3½ hours. After cooling slightly, the reaction mixture is added to a stirred slurry of ice-water hydrochloric acid. The precipitate which forms is recovered by filtration and dried to yield 3-nor-4,5-dihydroxy - 3 - desmethyl-11-oxo-18β-olean-12-en-30-oic acid.

EXAMPLE 12

By substituting an equivalent quantity of ethyl 3-nor-4-isopropylidine-4,4-desmethyl-11-oxo-18β-olean - 12 - en-30-oate in the procedure of Example 1 and otherwise successively following the procedures of Examples 1, 2, 3, 4, 5, 6 and 7, there is afforded ethyl 4,4-desmethyl-3,11-dioxo-18β-oleana-4,12-dien-30-oate.

EXAMPLE 13

To a stirred solution of 52.8 parts of mehyl 3-nor-4-desmethyl-11-oxo-18β-oleana-4,11-dien - 30 - oate in 158.4 parts of methanol, cooled in an isopropanol-Dry Ice bath, is added ozone for about 1½ hours until the solution acquires a blue color. The system is flushed with oxygen for about 10 minutes, and 40 parts of zinc and 420 parts of acetic acid are added. Stirring is continued while the reaction mixture is heated on a steam bath to a temperature of about 27°. At that time, 745 parts of chloroform is added and the mixture is filtered. The filtrate is washed with water and then with sodium bicarbonate, dried over anhydrous magnesium sulfate and sodium sulfate, and evaporated to dryness under reduced pressure, thus yielding methyl 3 - nor-4,5-seco-4,4-desmethyl-3,5,11-trioxo-18β-olean-12-en-30-oate. That compound is identical to the product of Example 6.

EXAMPLE 14

To a solution of 4.8 parts of potassium tert-butoxide in 118.3 parts of tert-butyl alcohol, heated at reflux temperature, is added a boiling solution of 12.4 parts of methyl 4,4-desmethyl-3,11-dioxo-18β-oleana-4,12-dien-30-oate in 130 parts of tetrt-butyl alcohol. To that resulting solution then is added dropwise a solution of 5.01 parts of methyl iodide dissolved in 98.5 parts of tert-butyl alcohol over a period of about 2½ hours while maintaining reflux conditions. Refluxing is continued for an additional ½ hour, after which time 10 parts of water, 12 parts of potassium carbonate and 68.4 parts of methyl iodide are added. That solution is allowed to reflux for 2½ hours. The reaction mixture is diluted with water and extracted with ethyl acetate and the organic phase is washed successively with water and saturated sodium chloride solution and filtered to yield a solid. That material is chromatographed on silicon dioxide using increasing amounts of ethyl acetate in benzene as eluant. The crude product is recrystallized from methylene chloride-methanol and dried under reduced pressure to yield methyl 4-desmethyl-3,11-dioxo-18β-oleana-4,12-dien-30-oate which is characterized by absorption maxima in the infrared spectrum at about 1617, 1662, and 1730 reciprocal centimeters and maxima in the nuclear magnetic spectrum at about 51, 69, 81, 89, 109, 158, 223 and 346 hertz. Also obtained from the chromatographic fractionation is methyl 3,11-dioxo-18β-oleana-5,12-dien-30-oate. That compound displays anti-bacterial and anti-estrogenic activity. It is characterized by absorption bands in the infrared spectrum at about 1620, 1650, 1700 and 1726 reciprocal centimeters and nuclear magnetic resonance absorption maxima at about 52, 66, 70, 70, 77, 77, 87, 223, 334 and 349 hertz.

What is claimed is:
1. A compound of the formula

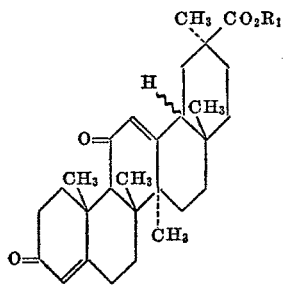

wherein $R_1$ is selected from the group consisting of hydrogen and lower alkyl radicals and the wavy line indicates the alternative 18α and 18β configurations.

2. As in claim 1, the compound which is methyl 4,4-desmethyl-3,11-dioxo-18β-oleana-4,12-dien-30-oate.
3. As in claim 1, the compound which is 4,4-desmethyl-3,11-dioxo-18β-oleana-4,12-dien-30-oic acid
4. As in claim 1, the compound which is 4,4-desmethyl-3,11-dioxo-18α-oleana-4,12-dien-30-oic acid.

References Cited
UNITED STATES PATENTS
3,484,477   12/1969   Turner _____ 260—468.5

LORRAINE A. WEINBERGER, Primary Examiner
R. GERSTL, Assistant Examiner

U.S. Cl. X.R.
260—514.5; 424—305, 317